(12) United States Patent
Ali et al.

(10) Patent No.: US 6,335,962 B1
(45) Date of Patent: Jan. 1, 2002

(54) APPARATUS AND METHOD FOR GROUPING AND PRIORITIZING VOICE MESSAGES FOR CONVENIENT PLAYBACK

(75) Inventors: Syed S. Ali, Allentown; Joseph M. Cannon, Harleysville; James A. Johanson, Emmaus; Joseph A. Sopko, Macungie, all of PA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/048,841

(22) Filed: Mar. 27, 1998

(51) Int. Cl.⁷ .............................................. H04M 1/64
(52) U.S. Cl. .................. 379/88.11; 379/67.1; 379/68; 379/88.04; 379/88.19
(58) Field of Search .................. 379/67.1, 68, 70, 379/74, 80, 82, 85, 88.01, 88.07, 88.08, 88.11, 88.12, 88.2, 88.21, 88.23, 88.26, 88.22, 88.19, 88.04; 369/25, 26, 27, 29

(56) References Cited

U.S. PATENT DOCUMENTS

| | | | |
|---|---|---|---|
| 4,582,956 A | | 4/1986 | Doughty .................. 379/93.14 |
| 4,596,901 A | * | 6/1986 | Hanscom et al. .......... 379/67.1 |
| 4,757,825 A | * | 7/1988 | Matthews et al. ....... 379/88.26 |
| 4,924,496 A | * | 5/1990 | Figa et al. .................. 379/142 |
| 5,153,905 A | * | 10/1992 | Bergeron et al. ........ 379/88.01 |
| 5,400,393 A | * | 3/1995 | Davies et al. ............ 379/88.11 |
| 5,524,140 A | | 6/1996 | Klausner et al. ......... 379/88.11 |
| 5,644,629 A | * | 7/1997 | Chow ......................... 379/142 |
| 5,742,668 A | * | 4/1998 | Pepe et al. ................. 379/67.1 |
| 5,751,793 A | * | 5/1998 | Davies et al. ............ 379/88.11 |
| 5,768,349 A | * | 6/1998 | Knuth et al. .................. 379/88 |
| 5,835,087 A | * | 11/1998 | Herz et al. ................... 345/327 |
| 5,844,980 A | * | 12/1998 | Patel et al. ................. 379/266 |
| 5,966,351 A | * | 10/1999 | Carleton et al. .............. 369/29 |
| 6,021,181 A | * | 2/2000 | Miner et al. ............. 379/88.23 |
| 6,058,178 A | * | 5/2000 | McKendry et al. ......... 379/212 |
| 6,229,878 B1 | * | 5/2001 | Moganti .................... 379/67.1 |

* cited by examiner

Primary Examiner—Allan Hoosain
(74) Attorney, Agent, or Firm—William H. Bollman

(57) ABSTRACT

A voice messaging system and method includes a voice recorder/playback device to store a plurality of voice messages associated with a respective plurality of incoming calls. A receiver receives call related information associated with each of the respective plurality of incoming calls. A controller is provided to organize the plurality of voice messages for playback by the voice recorder/playback device based on pre-stored groupings of expected call related information irrespective of an order in which voice messages are stored. In one aspect the pre-stored groupings relate to various priority levels for playback sequencing. In another aspect the pre-stored groupings relate to a specific voice mailbox or bin to receive the voice message. In yet another aspect, voice recognition techniques may be utilized to query the voice messaging system, either locally or remotely, for voice messages grouped in accordance with the principles of the present invention.

24 Claims, 5 Drawing Sheets

APPARATUS AND METHOD FOR GROUPING AND PRIORITIZING VOICE MESSAGES FOR CONVENIENT PLAYBACK

BACKGROUND OF THE INVENTION

1. Field of the Invention

This invention relates to a voice messaging system and more particularly, to a voice messaging system which is capable of regrouping more than one message together for convenient playback based, e.g., on call related information, a user compiled directory of groups, or caller designation as to a group to be associated with.

2. Description of Related Art

Voice messaging systems have become an essential part of our society. For instance, voice mail type systems installed with private branch exchanges (PBXs) are found in most businesses, while home usage of telephone answering devices is ever-increasing.

Conventional voice messaging machines are capable of receiving call related information, e.g., caller ID information, associated with an incoming call. Using caller ID, a caller's telephone number and/or household name is transmitted by the telephone company to the customer. Using Type I customer premises equipment, the caller ID information is transmitted during the silent interval between the first two rings in an on-hook condition. Type II customer premises equipment is capable of receiving caller ID information regarding call waiting calls while in an off-hook condition.

When an incoming call is answered by the voice messaging system, a voice message and caller ID information later associated therewith may be stored in the voice messaging system for retrieval by the user.

One conventional Type I or Type II customer premises equipment voice messaging system 111 is shown in FIG. 5. In FIG. 5, controller 118 controls operation of the voice messaging system 111. The controller 118 may be any suitable processor, e.g., a microprocessor, a digital signal processor (DSP), or a microcontroller.

The call related information is typically stored in a centralized database at the telephone company central office 113 which provides the caller ID service. A call related information detector/receiver 112 receives call related information, e.g., caller ID information regarding a calling party via a telephone line interface (TLI) 148, which is connected to a central office 113 via a telephone line 114. For Type I functionality, when the voice messaging system 111 is on-hook, call related information, e.g., the telephone number of the calling party is detected by the call information detector/receiver 112 during the silent interval between the first and second rings. The received call related information, e.g., the telephone number is displayed on a call related information display 128. For Type II functionality, the call related information, e.g., the caller ID information regarding an incoming third party call, is received while the customer premises equipment is off-hook. The caller ID information is received following a caller ID alerting signal sequence (CAS tones), and displayed on the call related information display 128.

The voice messaging system 111 includes a voice recorder/playback circuit 120 having a microphone 122 and a speaker 124 connected thereto. An alpha-numeric keypad 126 is also provided, e.g., to allow the user to manually control the voice messaging system 111.

With conventional voice messaging systems such as that shown in FIG. 5, voice messages are stored for playback in the order in which they were received.

It is recognized by the present inventors that telephone messages generally vary in interest, urgency and/or priority. Certain voice mail systems may allow a caller, when leaving a voice message, to place priority on the call for playback. However, after messages have accumulated in the voice messaging system, conventional voice messaging systems play back voice messages based on either the time that they were received, or an urgency the caller places upon them. However, such systems do not provide for a consistent urgency level or common grouping to be associated with voice messages because different callers may consider similar messages to be differently prioritized or grouped.

There is a need to provide a voice messaging system which can play back voice messages based on a grouping or priority that either is automatically determined, input by the user, or assigned by the caller.

Moreover, the same calling party may leave a number of voice messages. For example, a first caller may leave two or more voice messages during the day, while other calling parties may leave voice messages that are received between some of the voice messages left by the first caller. However, it is disruptive to listen to two or more messages from the same caller spread out with other voice messages between those from the same caller.

There is a need to reduce the disruption and improve message playback of two or more voice messages from a same caller.

SUMMARY OF THE INVENTION

In accordance with the principles of the present invention, a voice messaging system comprises a memory, and a call related information receiver adapted to receive call related information with respect to an incoming call. A voice recorder/playback circuit is adapted to record and playback voice messages. A processor is adapted to control a playback order of voice messages based on the received call related information.

In accordance with another aspect of the present invention, a voice messaging system comprises a memory adapted to store a plurality of call related information associated with any one of a plurality of groups. A call related information receiver is adapted to receive call related information with respect to an incoming call. A processor is adapted to compare the received call related information with the respective call related information entries stored in the memory to associate one of the plurality of groups with a voice message, and to reorder a playback of voice messages based on the plurality of groups.

In accordance with yet another aspect of the present invention, a voice messaging system comprises a memory, and a processor adapted to query a caller for selection of a group to be associated with a voice message recorded by the caller. The processor is further adapted to reorder a playback order of a plurality of voice messages based on selected groups associated with each of the plurality of voice messages.

A method of organizing for playback a plurality of voice messages in a voice messaging system in accordance with the principles of the present invention comprises storing a plurality of voice messages associated with a respective plurality of incoming calls. Call related information associated with each of the incoming calls is received, and voice messages are organized for playback based on a grouping of the call related information, irrespective of a chronological order of reception of the voice messages.

Another method of organizing for playback a plurality of voice messages in a voice messaging system in accordance with the principles of the present invention comprises providing pre-stored call related information entries each associated with one of a plurality of playback groups. A plurality of voice messages are stored together with a respective plurality of call related information based on respective incoming calls creating the plurality of voice messages. The stored plurality of call related information is compared with the pre-stored call related information entries to associate one of the plurality of playback groups with each of the stored plurality of voice messages. The plurality of voice messages are played back in an order of the plurality of playback groups.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention relates to a voice messaging system such as a telephone answering device or voice mail system which controls the playback sequence of voice messages. The embodiments described relate to a telephone answering device in particular, but the principles disclosed are equally applicable to voice messaging systems in general.

In conventional voice messaging systems, voice messages are stored for playback in the order in which they were received. In accordance with the principles of the present invention, the calls may be automatically regrouped for playback based on, e.g., call related information, or the user may "a priori" prioritize or group the playback sequence of voice messages based on call related information received with incoming calls, or the caller may designate a message group for playback purposes, e.g., according to subject matter of the message or language spoken.

Figure 1:
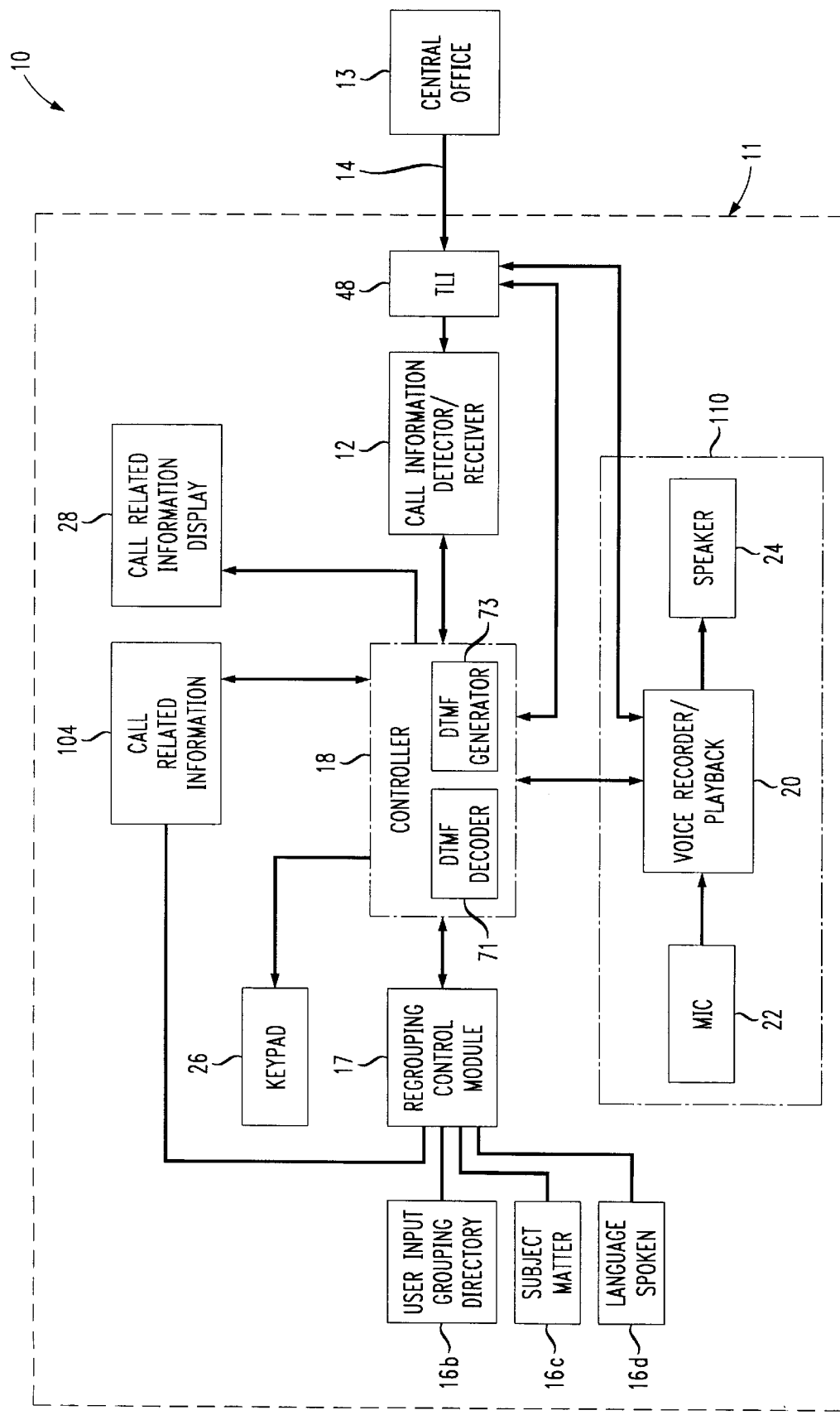
FIG. 1 is a block diagram illustrating a voice messaging system in accordance with the principles of the present invention.

With reference to FIG. 1, a voice messaging system, generally indicated at 10, includes a telephone answering device (TAD) 11 having a call information detector/receiver 12 which receives call related information from a central office 13 over a telephone line 14 via a telephone line interface (TLI) 48.

Call related information, e.g., caller ID information including a telephone number and a household name of a calling party may be transmitted to the TAD 11, e.g., between the first and second rings of an incoming call. Call related information stored at the central office 13 is transmitted to the TAD 11 by way of the call information detector/receiver 12.

A controller 18 is in communication with the alphanumeric keypad 26 and the display 28 for displaying call related information with respect to an incoming call. The controller 18 may be any suitable processor, e.g., a microprocessor, microcontroller, or digital signal processor (DSP).

The TAD 11 includes a voice module 110, including a voice recorder/playback circuit 20, a microphone 22 and a speaker 24 in communication with the controller 18. The function of the voice record/playback circuit 20 is to record voice messages in and to playback voice messages from voice message memory under the control of the controller 18. In accordance with the principles of the present invention, the order and/or grouping of voice messages for playback sequence are regrouped by the controller 18 and carried out by the recorder/playback circuit 20.

The controller 18 includes a dual tone, multiple frequency (DTMF) decoder 71 and a DTMF generator 73 relating to controls passed from an incoming call.

Voice messages may be played back locally at the TAD 11, or a caller remote from the TAD 11 may key-in predefined user ID information into the TAD 11 via DTMF tones indicating that the caller is authorized to remotely listen to recorded voice messages. In the conventional manner, the DTMF tones are received and detected by the controller 18 and converted into control signals. The controller 18 responds to the control signals, e.g., by causing playback of a recorded voice message, or by causing deletion of a recorded voice message. Controller 18 may be any suitable microprocessor, digital signal processor (DSP), or microcontroller.

Inventively, the present invention includes a regrouping control module 17 which causes a regrouping of the playback order of voice messages by the recorder/playback circuit 20. The regrouping of the playback order may be accomplished based on any of a number of possible messaging system in accordance with the principles of the present invention may include any one or a plurality of regrouping criteria.

For instance, the disclosed embodiment includes the ability to allow any one of four criteria to be used to regroup the playback order of voice messages.

In particular, the playback order may be automatically regrouped using a call related information module 104. Using the call related information module 104 (e.g., a telephone number of a calling party) as a basis for regrouping, the regrouping control module may automatically regroup together for sequential playback calls from the same party. Thus, all calls from, e.g., your mother, will be played back as a group.

Within any particular group, calls will be played back chronologically. Moreover, the groups will be played back in chronological order according to an earliest received message in each group. Thus, if your mother called first, your cousin called second, and your work called third, and in between other calls from your mother, cousin and work were recorded, all calls from your mother will be regrouped together and played back first, all calls from your cousin will be regrouped together and played back second, and all calls from your work will be regrouped together and played back last.

The voice messages may be regrouped and played back automatically without any user input. However, the user may control the automatic regrouping.

For instance, the TAD 11 may inform the user that "you have six messages from John Smith, five messages from Jane Doe" etc., and provide a menu to the user for selection of any particular group for playback. For instance, the user may select for playback the John Smith group of messages.

Alternatively, or in addition, the user may invoke the reordering operation of the regrouping control module 17 as messages are being played back, e.g., in a conventional chronological order. The TAD 11 may, after each message as appropriate, provide the option to the user for regrouping. For instance, a prompt to the user after a first message from John Smith is encountered in a conventional playback sequence that, e.g., "you have two more messages from John Smith. Would you like to hear these?" If the user indicates 'yes' by, e.g., pressing an appropriate key, then the regrouping control module 17 would search the group information associated with each voice message in memory to locate all other messages from John Smith for immediate playback.

A second criteria for regrouping the voice message for playback is the use of a user-compiled call related information grouping directory 16b. Using the grouping directory 16b, a user may pre-store call related information of expected callers by entering expected call related information into the grouping directory 16b, e.g., a telephone number and/or a household name of the expected callers.

The pre-stored call related information may be assigned a group number. For example, a group number such as 1, 2, 3, etc., is entered with, e.g., number 1 being associated with a first group (e.g., "all family"), number 2 being associated with a second group (e.g., "all work"), etc. The playback order may then be regrouped or reorganized to playback all voice messages from callers in group 1 first, then all voice messages from callers in group 2 second, etc. Alternatively, the playback order may be in chronological order with respect to the oldest message in each regrouping.

Each group may be given various ordering or priority for playback sequence. For example, the "all family" group may be given the highest priority for playback, and thus all voice messages in the "all family" group may be played back first irrespective of the order in which the voice messages were received and stored.

The grouping directory 16b may be stored in non-volatile memory, e.g., Flash memory or electrically erasable read only memory (EEPROM) at the TAD 11.

Figure 2:
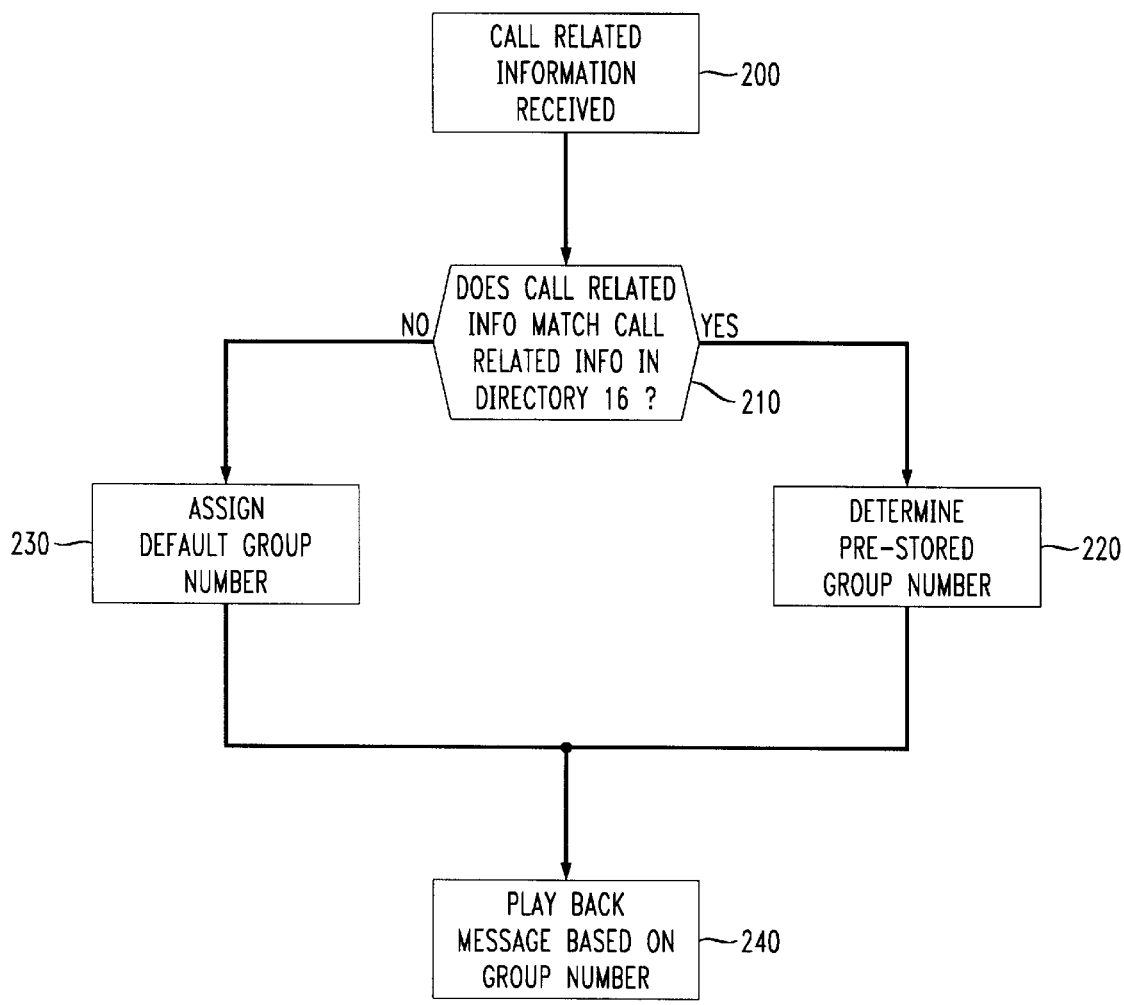
FIG. 2 is a flowchart of an operation of the voice messaging system in conformance with the present invention.

An embodiment of the regrouping according to a user-compiled call related information grouping directory 16b is shown in FIG. 2. When a call is received by the TAD 11, call related information such as a telephone number and/or a household name associated with the incoming call is received by the call information detector/receiver 12 (step 200). The call related information is then compared by controller 18 with pre-stored call related information, e.g., telephone numbers and/or household names contained in the regrouping directory 16b (step 210). Each voice message having call related information which matches an entry stored in the regrouping directory 16b will have a playback order corresponding to the pre-stored grouping in which the match to pre-stored call related information is found (step 220).

Figure 3:
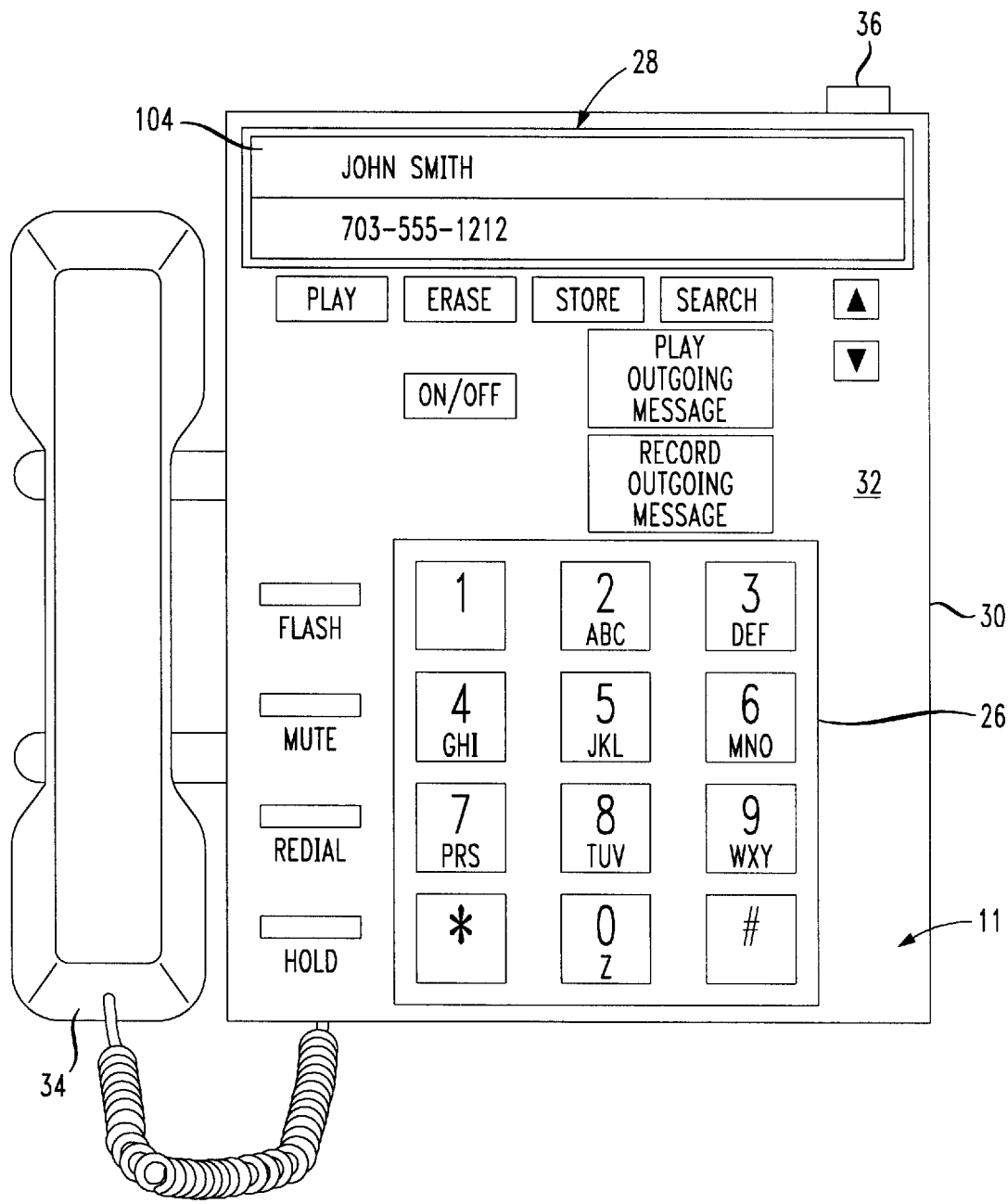
FIG. 3 is a physical view of a voice messaging system in conformance with the principles of the present invention.

If there is no match between the incoming call related information and call information in the regrouping directory 16b, the recorded voice message will be assigned a default group or a low priority group in terms of playback sequence (step 230 of FIG. 3).

The group number is used to organize a playback sequence of accumulated recorded voice messages in step 240 of FIG. 3. For example, a user may program the TAD 11 to playback voice messages in order of calling party A (group 1), then calling party B (group 2), then calling party C (group 3). If, in the following order, calling party C leaves a voice message C1, calling party A leaves voice message A1, calling party B leaves a voice message B1, and finally calling party A leaves another voice message A2, upon playback, the controller 18 instructs the voice recorder/playback circuit 20 to scan all corresponding information associated with the stored voice messages to playback voice messages in a sequence of A1, A2, B1 and C1. If two messages are in the same playback regrouping, those voice messages are played back chronologically, i.e., in the order that they were received.

A third criteria is that the voice messages may alternatively be played back according to regroupings based on subject matter. For instance, the TAD 11 may prompt the caller to select from a menu of subject matters either before or after they leave their voice message. The subject matter module 16c will then associate that voice message with the selected subject matter. Thereafter, the voice messages in each group may be played back in a predetermined subject matter order, or chronologically based on the oldest voice message in each group.

In particular, a calling party may program the grouping of his or her recorded voice message using DTMF keys to generate control signals in controller 18. For example, an outgoing announcing message from the TAD 11 will prompt the calling party to begin or end his or her voice message by selecting a group, e.g., by pressing a key between 1 and 9. This signal is received by the TAD 11 as DTMF tones and is associated with the voice message in voice message memory. In this way, calling party C may leave a message C1 in group 5. Next, calling party B may leave a voice message B1 in group 1. Thereafter, calling party A may leave a voice message A1 in group 9. Each voice message and the associated group identification is stored in voice message memory.

Once instructed, the voice recorder/playback circuit 20 scans the voice message memory and organizes the playback of all voice messages based on their regrouping. Based on the regrouping, the voice messages are played back in the order of, e.g., B1, the C1, followed by A1. If two messages are in the same regrouping, those voice messages are played back in the order received. It can be appreciated that since the grouping of each voice message may be caller defined in this embodiment of the present invention, the TAD 11 need not have caller ID capabilities.

Similarly, as a fourth criteria, the caller may be prompted to select from a menu of possible languages corresponding to the language spoken by the caller, and the messages may be regrouped for playback according to the language spoken. Alternatively, voice recognition techniques may be used to automatically determine the language of a voice message and automatically group the voice messages accordingly. In this case, a default language such as English may be automatically assigned if a language is not otherwise determined, e.g., by the voice recognition techniques.

In yet another embodiment of the present invention, a user may query the TAD 11 for playback of voice messages having specific call related information associated therewith. For instance, a user may request playback of all messages from, e.g., a sister, based on the sister's telephone number. The user would enter the telephone number of the sister, and controller 18 of the TAD 11 would search all recorded voice messages for messages associated with call related information which matches the query request, e.g., the telephone number of the sister.

The telephone number of the sister may be pre-stored in the TAD 11 and selected by a keypress or remotely by entry of appropriate dual tone multiple frequency (DTMF) tones. Thereafter, the query can be requested by entering a simple code uniquely associated with the call related information of, e.g., the sister.

In an alternative embodiment of this aspect of the present invention, the query for voice messages from a particular person or group of persons grouped according to call related information, may be entered into the TAD 11 via voice and converted into a control signal with voice recognition techniques.

The grouping of messages based on call related information in accordance with the present invention may relate to a single caller or to a group of callers. For instance, the user may pre-store call related information relating to all family members so that all family members are grouped together for playback.

Among similarly grouped voice messages, the playback order may be chronological in order received.

In another aspect of the present embodiment, the voice messages may be automatically routed to individual voice mailboxes or bins in accordance with the assigned grouping. For instance, the ID information grouping directory 16 may include a list of call related information relating to incoming calls which is to be routed to particular voice mailboxes. Thus, a priority level may be used to group all similarly prioritized voice messages in individual voice mailboxes.

In the illustrated embodiment of FIG. 3, the TAD 11 is packaged to fit within a console 30 including a control panel 32. The console 30 may be equipped with a standard handset 34 and a phone jack 36 which can be interconnected with any standard telephone company modular jack, e.g., an RJ-11 jack. The control panel 32 includes a liquid crystal display (LCD) 28 and an alpha-numeric keypad 26. As noted above, the LCD 28 may display the call related information 104 of the incoming calls, e.g., the telephone number and/or the household name associated with the incoming call. If there is no call related information relating to a particular incoming call, the LCD 28 is blank or otherwise indicates that call related information is not available for that particular call. The display 28 is also used to display relevant call related information and/or regroupings when inputting the regrouping information.

Figure 4:
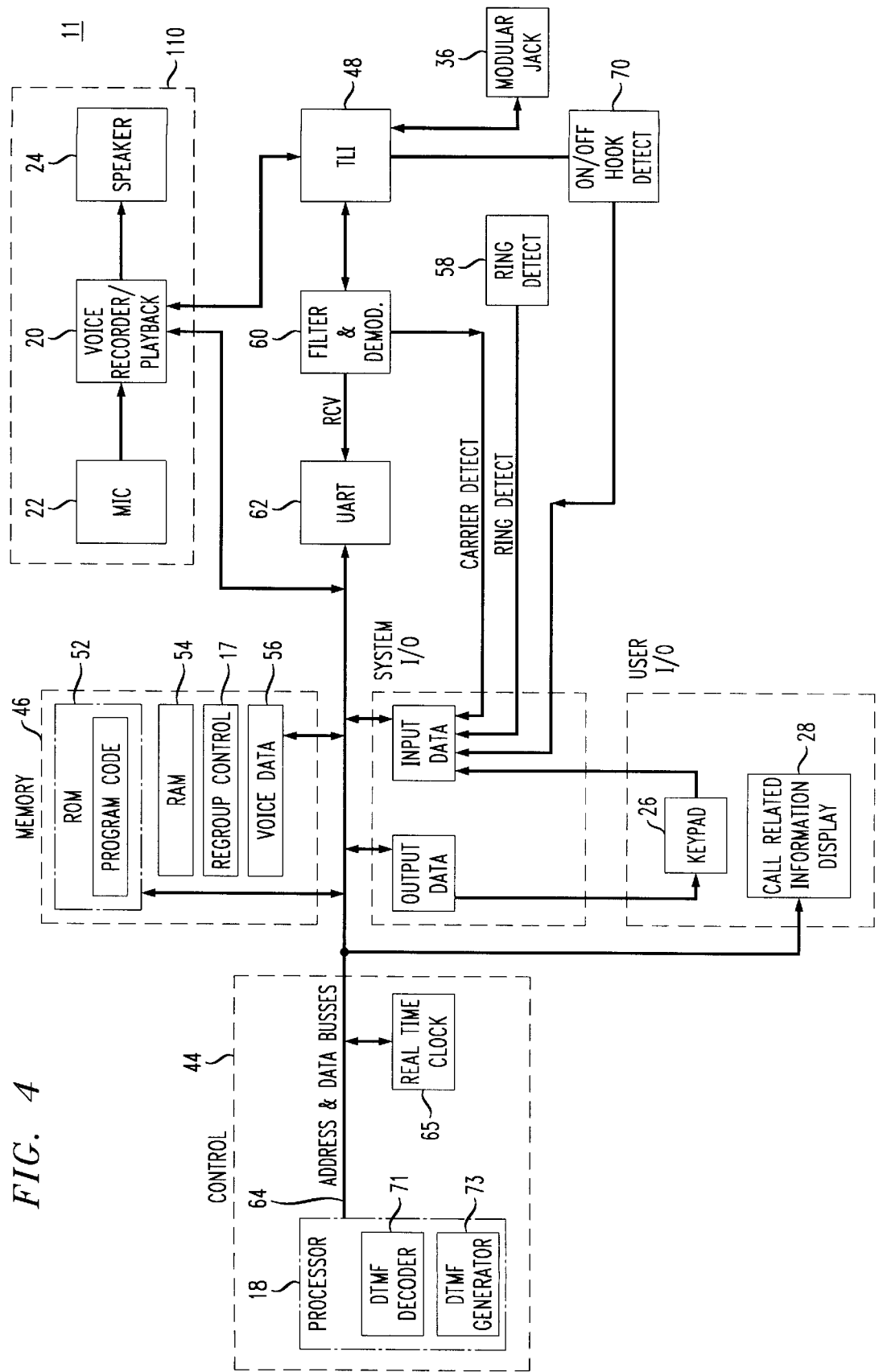
FIG. 4 is a more detailed block diagram of one embodiment of the voice messaging system shown in FIG. 1.
Figure 5:
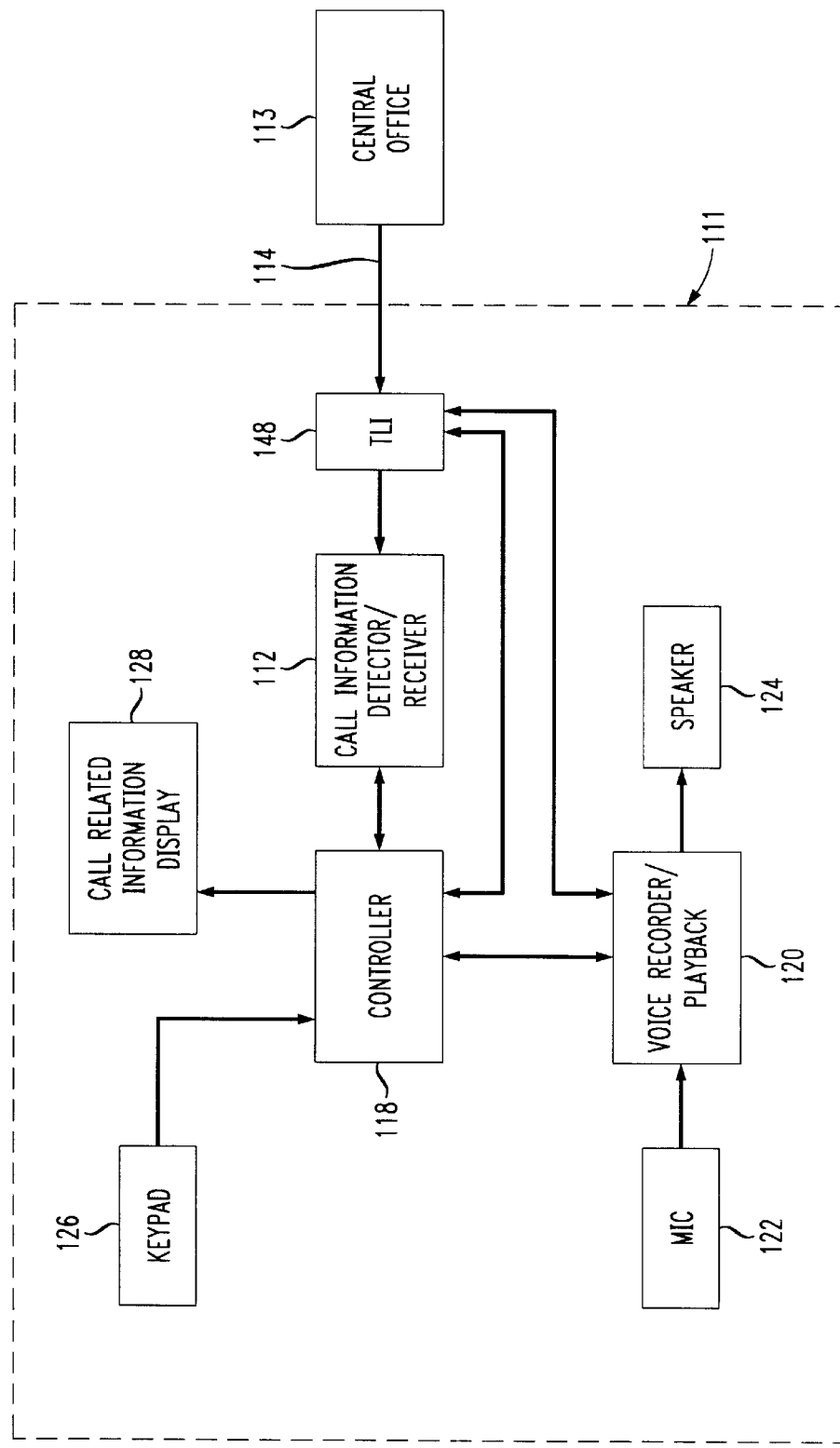
FIG. 5 is a block diagram of a conventional voice messaging system.

FIG. 4 shows a detailed circuit diagram of the TAD 11 shown in FIGS. 1 to 3. The TAD 11 includes a control circuit 44, memory 46, telephone line interface circuit (TLI) 48, display 28 and voice module 110. The regrouping is associated with the voice message and the voice message is stored in memory 54.

Control circuit 44 includes the controller 18 which controls the TAD 11 by executing instructions that are stored in program code in ROM 52. Random access memory (RAM) 54 is also provided. In addition, Flash memory or other non-volatile rewritable memory is provided to store voice messages and to store log and regrouping data 55.

A real time clock circuit 65 provides the TAD 11 with the current time and date.

The controller 18 controls the functioning of the voice/playback circuit 20 with control signals such as PLAY, RECORD, ERASE and STOP.

The telephone line interface circuit 48 includes circuitry which permits the TAD 11 to be connected directly to a standard telephone module jack, i.e., an RJ-11 jack. The telephone line interface circuit 48 also includes various control and monitoring circuits that are common to ordinary telephones. These circuits are conventional and may include an electronic telephone circuit (not shown) for controlling dialing functions and for interfacing a telephone handset. A ring detect circuit 58 for detecting the ring signal of an incoming call and an on/off hook detect circuit 70 are also provided. In the illustrated embodiment, the TAD 11 includes a filter and demodulating circuit 60 that is used for demodulating an incoming serial data stream relating to call related information. Data received by the filter and demodulating circuit 60 includes at least data representing the telephone number of an incoming call. Data relating to a household name associated with the telephone number of the incoming call may also be received by the filter and demodulating circuit 60. The protocol necessary for the otherwise conventional portions of the circuit shown in FIG. 4 is described in U.S. Pat. No. 4,582,956, the disclosure of which is hereby incorporated by reference into the present specification.

Frequency shift keying, phase shift keying, quadrature amplitude modulation or any other suitable modulation technique may be used for transmitting a serial data stream to the TAD 11. A universal asynchronous receiver/transmitter (UART) 62 is used to convert the demodulated serial data received from the filter and demodulating circuit 60 to a parallel format read by the controller 18 via address and data busses 64. Alternatively, the controller 18 can perform the UART function.

Operation of the TAD 11 shown in FIGS. 1–4 is as follows. When a caller initiates a call to the TAD 11, the ring detect circuit 58 provides a signal indicative of the incoming ring signal to the controller 18. Call related information is transmitted by the central office 13 to the TAD 11 during the silent period between the first and second rings, and is stored in the log data memory 55. After a default or selected number of rings, the TAD 11 answers the incoming call. An on/off hook detect circuit 70 places the TAD 11 in the off-hook state, thereby causing the voice/playback circuit 20 to provide an outgoing announcing message to the caller. The voice recorder/playback circuit 20 is, e.g., as disclosed in U.S. Pat. No. 5,524,140, the content of which is hereby incorporated into the present specification by reference.

Voice message signals are transmitted to and from the voice recorder/playback circuit 20 via the telephone line 14, RJ-11 jack 36, and telephone line interface 48. The voice message signal is preferably digitized, compressed and presented to the controller 18 for storage in the voice message memory. It can be appreciated that other storage devices such as cassette tapes are also possible.

The incoming voice messages are linked with the call related information stored in log data memory 55 for that incoming call and compared with the call related information entries in the ID information grouping directory 16 to determine the playback group of voice messages in the manner discussed above. When playing back recorded voice messages, the call related information associated with the played back voice message is displayed on LCD 28. Alternatively, the caller programmed regrouping assigned by DTMF signaling is associated with the incoming call to direct the playback regrouping of voice messages.

The controller 18 can distinguish three states during a call: call in progress (voice signals), DTMF signals, and call termination (dial tone or silence), by reading the level and modulation of the signals on the telephone line 14. The voice recorder/playback circuit 20 can distinguish between the tones of DTMF signals and the signal level ranges associated with human speech detected on the telephone line 14. If voice signals are detected, the controller 18 immediately executes a voice record routine. If no voice is present on the telephone line 14, but DTMF signals are being transmitted, the controller 18 executes a DTMF decode routine. If there is a dial tone or silence on the telephone line 14 for a predetermined period of time, e.g., five seconds, the controller 18 causes the on/off hook detect circuit 70 to go "on-hook", hanging up the telephone and thus terminating the call.

The present invention has been described with reference to Type I (on-hook) caller ID service. With Type I caller ID service as discussed above, the caller ID information is transmitted generally during the silent interval between the first two rings. Type I caller ID systems which receive caller ID information relating to incoming calls when the called party is in an on-hook mode are known as Calling Identity Delivery (CID) systems.

The present invention is also applicable to the grouping of call related information. Thus, it not only relates to Type I type customer premises equipment but also to Type II caller ID service which includes all Type I features but also accommodates the transmission of caller ID information while the TAD is already off-hook with another party, e.g., additionally accommodates call waiting (CW) service. The handset or speaker and microphone of a Type II called party's customer premises equipment is conventionally muted while caller ID information is transmitted by the central office. Type II caller ID/call waiting service is abbreviated as CIDCW.

While the disclosed embodiments describe the reception of caller ID information, the invention relates to the reception and processing of any call related information.

A voice messaging system in accordance with the principles of the present invention provides an effective way to regroup and reorder the playback of voice messages based on call related information, e.g., caller ID information, for convenient and less disruptive playback of voice messages.

While the invention has been shown and described with reference to the exemplary preferred embodiments thereof, those skilled in the art will be able to make various modifications to the described embodiments of the invention without departing form the true spirit and scope of the invention.

What is claimed is:

1. A voice messaging system comprising:
    a memory in customer premises equipment;
    a Caller ID receiver in customer premises equipment to receive Caller ID information with respect to an incoming call;
    a voice recorder and playback circuit in customer premises equipment adapted to record and playback voice messages; and
    a processor in customer premises equipment adapted to regroup a playback order of voice messages selectively based on at least one of Caller ID information, a user-compiled call related information grouping directory, subject matter, and language of said incoming call.

2. The voice messaging system according to claim 1, wherein:
    said playback order of voice messages recorded within said mailbox includes all voice messages from the same received Caller ID information to be played back as a group.

3. The voice messaging system according to claim 1, wherein:
    said processor is adapted to query a user for other voice messages from a same party based on said received Caller ID information.

4. The voice messaging system according to claim 1, wherein:
    said Caller ID information includes a telephone number.

5. The voice messaging system according to claim 1, wherein:
    said Caller ID information includes a household name.

6. A voice messaging system comprising:
    a memory in customer premises equipment adapted to store a plurality of Caller ID information associated with any one of a plurality of groups;
    a Caller ID receiver in customer premises equipment to receive Caller ID information with respect to an incoming call; and
    a processor in customer premises equipment adapted to compare said received Caller ID information with said respective Caller ID information entries stored in said memory to associate one of said plurality of groups with a voice message, and to reorder a playback of voice messages within a at least one mailbox selectively based on at least one of Caller ID information, a user-compiled call related information grouping directory, subject matter, and language of said incoming call.

7. The voice messaging system according to claim 6, wherein:
    said processor is further adapted to playback voice messages recorded within said mailbox within any of said plurality of groups chronologically.

8. The voice messaging system according to claim 6, wherein:
    said processor is further adapted to query a user during playback for playback of other messages in said same group as a current voice message.

9. The voice messaging system according to claim 6, wherein:
    said Caller ID information includes a telephone number.

10. The voice messaging system according to claim 6, wherein:
    said Caller ID information includes a household name.

11. A voice messaging system comprising:
    a memory in a telephone answering device;
    a processor in said telephone answering device adapted to query a caller for selection of one of a plurality of groups to be associated with a voice message recorded by said caller, said processor further adapted to assign said voice message to said group selected by said caller and to reorder a playback order of a plurality of voice messages within a mailbox selectively based on at least one of Caller ID information, a user-compiled call related information grouping directory, subject matter, and language of said caller.

12. The voice messaging system according to claim 11, wherein:
    said processor is further adapted to playback voice messages recorded within said mailbox within any of said plurality of groups chronologically.

13. The voice messaging system according to claim 11, wherein:
    said processor is further adapted to query a user during playback for playback of other messages in said same group as a current voice message.

14. A method of organizing for playback a plurality of voice messages in a voice messaging system, said method comprising:
    storing in customer premises equipment a plurality of voice messages within a at least one mailbox and associated with a respective plurality of incoming calls;

receiving in customer premises equipment Caller ID information associated with each of said respective plurality of incoming calls; and organizing in customer premises equipment said plurality of voice messages recorded within said at least one mailbox for playback selectively based on at least one of Caller ID information, a user-compiled call related information grouping directory, subject matter, and language of said incoming call.

15. The method of organizing for playback a plurality of voice messages in a voice messaging system according to claim 14, wherein:

said Caller ID information includes a telephone number.

16. The method of organizing for playback a plurality of voice messages in a voice messaging system according to claim 14, wherein:

said Caller ID information includes a household name.

17. A method of organizing for playback a plurality of voice messages in a voice messaging system, said method comprising:

providing in customer premises equipment a plurality of pre-stored Caller ID information entries each associated with one of a plurality of playback groups;

storing in customer premises equipment a plurality of voice messages within at least one mailbox and a respective plurality of Caller ID information based on respective incoming calls creating said plurality of voice messages;

comparing in customer premises equipment said stored plurality of Caller ID information with said pre-stored Caller ID information entries to associate one of said plurality of playback groups with each of said stored plurality of voice messages recorded within said at least one mailbox; and playing back in customer premises equipment said plurality of voice messages recorded within said at least one mailbox selectively based on at least one of Caller ID information, a user-compiled call related information grouping directory, subject matter, and language of a caller.

18. The method of organizing for playback a plurality of voice messages in a voice messaging system according to claim 17, wherein:

voice messages recorded within said mailbox in one of said plurality of playback groups having a higher priority than other voice messages recorded within said mailbox are played back before said other voice messages.

19. The method of organizing for playback a plurality of voice messages in a voice messaging system according to claim 17, wherein:

said Caller ID information includes a telephone number.

20. The method of organizing for playback a plurality of voice messages in a voice messaging system according to claim 17, wherein:

said Caller ID information includes a household name.

21. The method of organizing for playback a plurality of voice messages in a voice messaging system according to claim 17, wherein:

said plurality of voice messages recorded within said mailbox are played back based on control signals input to said voice messaging system.

22. The method of organizing for playback a plurality of voice messages in a voice messaging system according to claim 17, wherein:

said plurality of voice messages recorded within said mailbox are played back based on control signals generated by voice recognition of spoken commands from a user of said voice messaging system.

23. Apparatus for organizing for playback a plurality of voice messages in a voice messaging system, said apparatus comprising:

means in customer premises equipment for storing a plurality of voice messages within a at least one mailbox and associated with a respective plurality of incoming calls;

means in customer premises equipment for receiving Caller ID information associated with each of said respective plurality of incoming calls; and means in customer premises equipment for organizing said plurality of voice messages recorded within said at least one mailbox for playback selectively based on at least one of Caller ID information, a user-compiled call related information grouping directory, subject matter, and language of a caller.

24. Apparatus for organizing for playback a plurality of voice messages in a voice messaging system, said apparatus comprising:

means in customer premises equipment for providing a plurality of pre-stored Caller ID information entries each associated with one of a plurality of playback groups;

means in customer premises equipment for storing a plurality of voice messages within a single mailbox and a respective plurality of Caller ID information based on respective incoming calls creating said plurality of said voice messages;

means in customer premises equipment for comparing said stored plurality of Caller ID information with said pre-stored Caller ID information entries to associate one of said plurality of playback groups with each of said stored plurality of voice messages recorded within said single mailbox; and means in customer premises equipment for playing back said plurality of said voice messages selectively based on at least one of Caller ID information, a user-compiled call related information grouping directory, subject matter, and language of said incoming call.

* * * * *